Sept. 7, 1943.  T. W. WINSOR  2,328,596
AUTOMATIC START-STOP WELDING GENERATOR
Filed Jan. 23, 1936
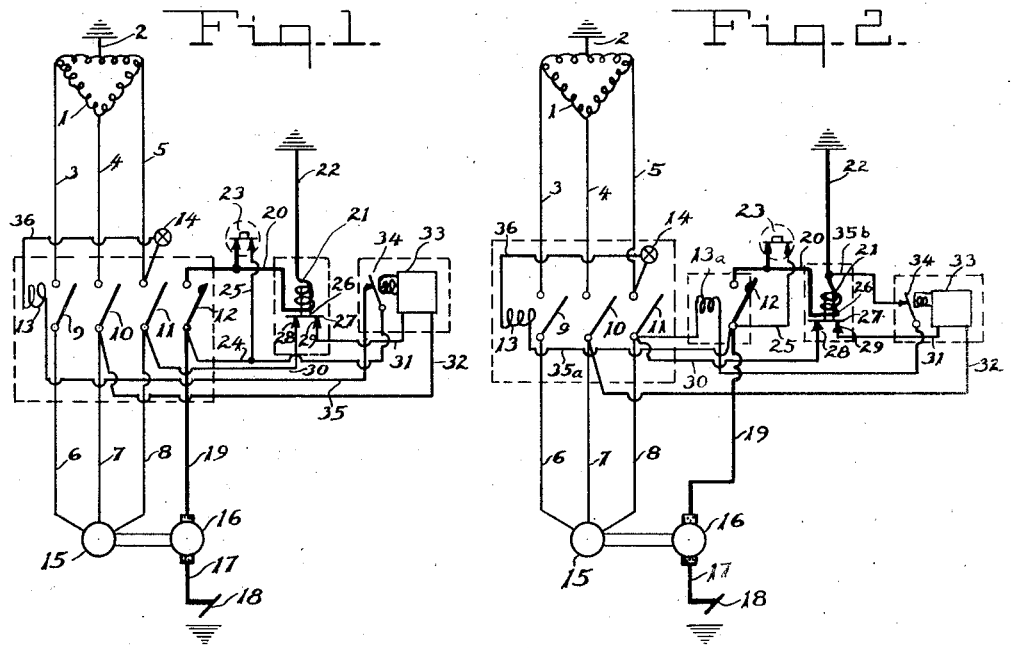
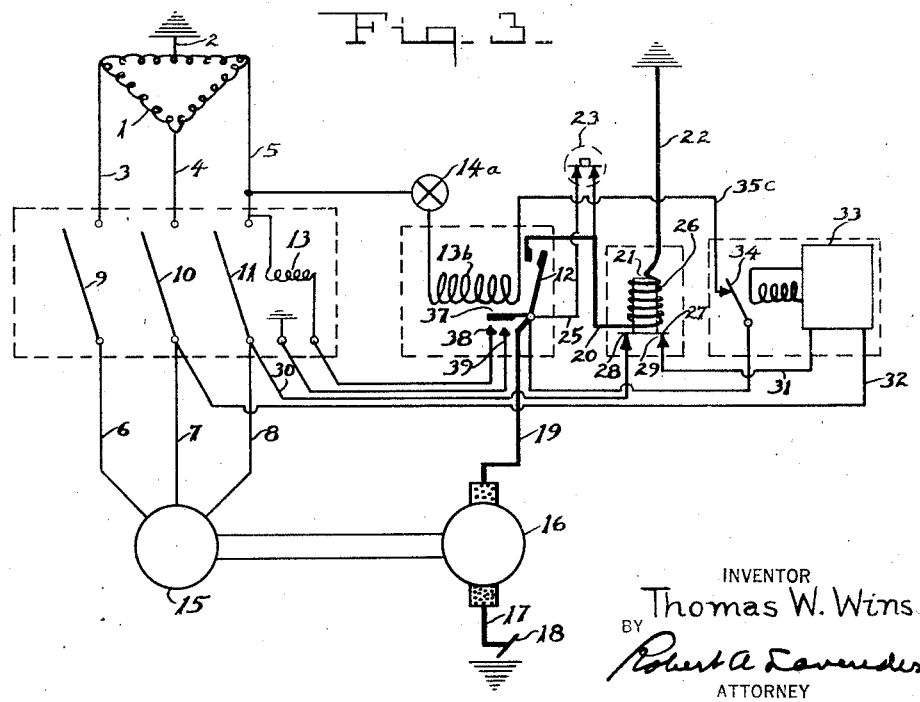
INVENTOR
Thomas W. Winsor
BY
Robert A. Lavender
ATTORNEY Patented Sept. 7, 1943

2,328,596

UNITED STATES PATENT OFFICE 2,328,596

AUTOMATIC START-STOP WELDING GENERATOR

Thomas W. Winsor, Bremerton, Wash.

Application January 23, 1936, Serial No. 60,427

15 Claims. (Cl. 219—8)

(Granted under the act of March 3, 1883, as amended April 30, 1928; 370 O. G. 757)

This invention relates to electrical systems and, more particularly, to a system for automatically starting a welding current generator responsive to a demand for welding current and for automatically stopping the generator responsive to the lack of a demand for welding current over a predetermined length of time.

In the art of arc welding it has been proposed heretofore to cut down the time that welding potentials are applied to the welding electrodes to substantially the time that is used in welding. The united States patent to Candy, 1,343,194, and the British unaccepted patent specification 232,598 disclose systems of this general type wherein the application of welding potentials to the welding electrodes is controlled by means of an auxiliary circuit including a switch mounted on the welding electrode holder.

The present invention is concerned with arc welding sets of the motor-generator type in which the motor is driven from power circuits either D. C. or A. C. of any number of phases or cycles. It provides a means for automatically stopping the machine at the end of a set time interval after welding ceases and also to restart it when the welder desires. Its purpose is to save the no-load power consumption of the set while it is not needed and relieve the power line of unnecessary load current as well as to eliminate idle running and unnecessary wear on the set when not in use. The novel features are: first, the fact that stopping requires no operation on the part of the mechanic, occurring automatically when he ceases welding for a predetermined time; second, starting it at the will of the mechanic even though he may be on the end of a 400-foot length of welding cable and out of sight of the machine; and third, no additional portable conductors nor apparatus must be dragged around by the mechanic. A local starting switch provides means for starting the welding machine at the machine if desired and a safety switch locks out the machine so it cannot be started at the welding station. There are four essential elements to the complete device, a magnetic starter for the motor, a magnetic switch which opens and closes the welding circuit, a series relay which opens a control circuit so long as current flows in its series coil, and a time relay which opens a control circuit at a set time interval after it is electrically energized.

The primary object of this invention is to provide a welding system wherein the welding motor-generator set is automatically shut off after a predetermined period of idleness and is restarted automatically when the welder attempts to weld.

Another object of this invention is to provide a remotely controlled welding motor-generator set, in which no portable conductor other than the welding conductor is required for remote control starting and stopping of the set.

A further object of this invention is to provide a safety switch for preventing the automatic starting of the motor-generator set when said switch is opened.

A still further object of this invention is to provide a local starting switch for starting the motor-generator set at the set, independent of the remote control starting.

Other and further objects of this invention will become apparent from the specification following taken in connection with the accompanying drawing wherein Figs. 1 to 3 show diagrammatically certain preferred embodiments of the invention.

In the drawing the same reference characters are used to denote like parts in the several figures. In Fig. 1, a three-phase delta connected transformer secondary is shown at 1. The midpoint of the winding of one phase is grounded at 2. Conductors 3, 4, and 5, respectively, are connected between the transformer winding 1 and the terminals of a switch 9—10—11. Conductors 6, 7, and 8, respectively, are connected from the opposite terminals of the switch 9—10—11 to the three-phase motor 15. Switch blades 9, 10, and 11 are adapted when closed to connect conductors 3, 4, and 5 with conductors 6, 7, and 8, respectively, to drive the motor 15 from the three-phase transformer secondary 1. A further switch blade 12 is mounted alongside of blades 9, 10 and 11 and these blades, as a group, are associated with electromagnet or solenoid 13 by means of which the blades 9, 10, 11, and 12 may be moved into closed position upon the energization of the electromagnet or solenoid 13. One terminal of the solenoid or electromagnet 13 is connected by means of conductor 36 and safety switch 14 to the conductor 5 leading from the transformer. The other end of the solenoid 13 is connected by way of a conductor 35 to the back contact of a relay 33 having an armature 34. The motor 15 is mechanically connected to drive the welding current generator 16. Conductor 17 connects the arc welding electrode 18 to one terminal of the welding current generator 16. The conductor 19 connects the other terminal of the welding current generator to the switch blade 12. The switch blade 12 when moved to closed position connects the conductor 19 to the conductor 20. The conductor 20 is connected to one of the terminals of the series relay 21 and the other teminal of the series relay is grounded by means of the conductor 22. A normally open switch 23 is shown connected between conductors 19 and 20 by means of conductor 25. The series relay 21 has associated therewith an armature 26 carrying a movable conductor 27 associated with back contacts 28 and 29. The back contact 28 is connected by means of the lead 30 to conductor 8 and the back contact 29 is connected by means of the lead 31 to one terminal of the slow-to-energize relay 33 which has its other terminal connected to the conductor 7 by way of the conductor 32. The armature 34 of the slow relay 33 is connected by way of the conductor 24 to the conductor 19.

The operation of the system shown in Fig. 1 is as follows: With the transformer secondary 1 energized and switch 14 closed, the welder, when he desires to start welding, grounds the welding electrode 18 to ground at 2 and the electromagnet or solenoid 13 is energized by way of the following circuit: ground 2, electrode 18, conductor 17, generator 16, conductor 19, conductor 24, armature 34 of relay 33, back contact associated therewith, conductor 35, solenoid 13, conductor 36, switch 14, conductor 5, and one-half of one of the windings of one phase of the transformer 1 to ground at 2. Upon the energization of solenoid 13, switch blades 9, 10, 11, and 12 are simultaneously moved to closed position and the motor 15 is then started. As the generator 16 begins generating, current will flow therefrom over the following circuit: ground 22, welding electrode 18, conductor 17, generator 16, conductor 19, switch blade 12, conductor 20, series relay 21, conductor 22, to ground. The flow of current by way of this circuit, including the series relay 21, causes the armature or core 26 of the solenoid or electromagnet of the series relay to be raised, thus opening the circuit between conductor 27 and back contacts 28 and 29. As long as welding current continues to flow from the generator 16, the circuit of slow relay 33 remains open at contacts 28 and 29 of the series relay 21 and the generator 16 will continue to be driven by the motor 15. When the welding current circuit is broken and no welding current flows through the series relay 21, the armature or core 26 drops down and conductor 27 closes the circuit of slow relay 33 and permits the relay to be energized by way of the following circuit: conductors 7, 32, relay 33, conductor 31, back contact 28, conductor 30, to conductor 8. Inasmuch as conductors 7 and 8 have the same potential impressed thereon as conductors 4 and 5, it is seen that the slow relay 33 will be energized. The relay 33, however, is a slow-to-energize relay and it is only when the circuit of this relay has been closed for a predetermined time that it becomes fully energized to attract its armature 34 and open the circuit of the solenoid 13. When the circuit of the solenoid 13 is open, switch blades 9, 10, 11, and 12 are urged to open position by means of a spring (not shown). Upon the opening of switch blades 10 and 11, potential is no longer applied to relay 33, the armature 34 thereof falls back, and the position of the apparatus becomes that shown in Fig. 1.

In the above description, it has been assumed that the welding generator was started automatically responsive to the grounding of the welding electrode 18. However, the generator may be started by means of switch 23. When the switch 23 is closed, solenoid 13 is energized by way of ground, conductor 22, series relay 21, conductor 20, switch 23, conductor 25, back contact of relay 33, conductor 35, solenoid 13, conductor 36, switch 14, conductor 5, and thence to the transformer and ground. So long as welding current continues to be drawn from the generator 16, the switch blades actuated by solenoid 13 are maintained in closed position and the operation of the system is substantially that described above, the only difference being in the manner of starting. When it is desired to disable the automatic starting of the welding generator, the switch 14 may be opened. With switch 14 open, the solenoid winding 13 cannot be energized responsive to a grounding of the welding electrode 18 or the closing of switch 23.

The system shown in Fig. 2 is similar in many respects to that of Fig. 1. However, it differs therefrom in that switch blades 9, 10, and 11 are operated by a different solenoid from that used to operate blade 12. The various parts of the system shown in Fig. 2 that perform identical functions to parts in Fig. 1 are given the same numerals as the similar parts in Fig. 1 and only the additional parts bear different designations. The solenoid used to close switch blade 12 in Fig. 2 is designated at 13a. The solenoid 13 in Fig. 2 is connected by way of conductor 35a directly to the conductor 19 while the back contact of the slow-to-energize relay 33 is connected by means of the conductor 35b to the conductor 22, instead of to the solenoid 13 as in Fig. 1. In all other respects the system shown in Fig. 2 is identical with Fig. 1. The operation of the system of Fig. 2 is as follows: The operator may close the switch 23 or he may connect the welding electrode 18 to ground to start the motor-generator set. In either method the solenoid 13 is energized from the transformer 1 by way of conductor 35a. Upon the energization of solenoid 13, switch blades 9, 10, and 11 are drawn to closed position and the motor 15 starts and drives generator 16. The solenoid 13a is energized from grounded transformer 1 by way of conductor 5, switch blade 11, solenoid 13a, back contact of slow relay 33, and conductor 22 to ground. The solenoid 13a will continue to be energized so long as switch blade 11 is in closed position and the relay armature 34 is lying against its back contact. The armature 34 of the slow relay 33 will remain in the position shown so long as welding current continues to be drawn from the generator 16. However, when the welding current circuit is broken at 18, the solenoid 21 de-energizes and completes the circuit of the slow relay 33 and this relay after a predetermined time opens the circuit of solenoids 13a by way of the back contact associated with relay armature 34. Upon the de-energization of solenoid 13a, switch blade 12 is moved to open position as shown, thus opening the circuit of solenoid 13. By the de-energization of solenoid 13, switch blades 9, 10, and 11 are moved to open position and the system is again in readiness to be started by way of either the switch 23 or by grounding the welding electrode 18.

The system shown in Fig. 3 is quite similar to that of Fig. 2 but it differs therefrom in that solenoid 13a is replaced by solenoid 13b and this solenoid is connected in circuit between the conductor 5 and the back contact of the relay 33, the armature of which is connected to conductor 19 as in Fig. 1. The safety switch 14 is replaced by safety switch 14a in the circuit of the solenoid 13b. The switch blade 12 carries therewith, but insulated therefrom, a conductor 37 associated with contacts 38 and 39 which are used to complete the circuit of solenoid 13.

The operation of the system shown in Fig. 3 is as follows: Either the switch 23 is closed or the welding electrode 18 is grounded to start the motor-generator set. By either of these methods the solenoid 13b is energized by way of the following circuit: ground to conductor 19, armature 34 of relay 33, back contact associated with armature 34, conductor 35c, solenoid 13b, safety switch 14a, conductor 5, and thence to the grounded winding of the transformer secondary. Upon the energization of solenoid 13b, the switch blade 12 is moved into position to close the circuit between the conductors 19 and 20. Simultaneously with the closing of switch blade 12, the conductor 37 is brought into contact with forward contacts 38 and 39 to ground that end of the solenoid 13 opposite to the end connected to conductor 5. Current now flows through the solenoid 13 from the transformer primary 1, conductor 5, solenoid 13, and contact 38, conductor 37, contact 39, to ground. Solenoid 13, when energized, connects the conductors 3, 4, and 5 to conductors 6, 7, and 8, respectively, by means of the respective switch blades 9, 10, and 11. The motor 15 is started upon the closing of switch blades 9, 10, and 11 and the generator 16 is driven by the motor 15 to supply welding current as long as it is desired. So long as welding current is being drawn from generator 16, the solenoid 26 is maintained energized and the circuit of relay 33 is open at contacts 28 and 29. However, when the welding current circuit is broken, the solenoid 21 de-energizes, closing a connection between back contacts 28 and 29 by means of conductor 27 to cause the energization of relay 33 from conductors 7 and 8. When relay 33 energizes, the armature 34 is drawn from its back contact to open the circuit of solenoid 13b permitting switch blade 12 to move to open position, thereby opening the circuit of solenoid 13 at contacts 38 and 39. When the circuit of solenoid 13 is open, the switch blades 9, 10, and 11 are urged to open position and the motor generator is stopped until such time as the operator again closes switch 23 or presses welding electrode 18 against ground.

In the above description and in the drawing, three-phase alternating current has been dealt with as the primary source of energy; however, it is to be understood that one or two-phase alternating current sources of supply or direct current sources may be utilized to drive the motor. The relay 33 has been disclosed as being a slow-to-energize relay. This relay is preferably constructed with a dashpot or other adjustable device so that the time it takes to be energized may be adjusted to suit the needs of a particular installation. In general, the time constants of the relay are so adjusted as to prevent the energization thereof in such a short time as to permit the stopping of the motor-generator set during the time that welding electrodes are being changed or moved to a slightly different position.

It will be understood that the above description and accompanying drawing comprehend only the general and preferred embodiments of the present invention and that various changes in construction, proportion, and arrangement of parts may be made within the scope of the appended claims without sacrificing any of the advantages of this invention.

The invention disclosed herein may be manufactured and used by or for the Government of the United States of America for governmental purposes without the payment of any royalties thereon or therefor.

I claim:

1. A welding system comprising a motor-generator set, a source of power for driving the motor of said set, said source of power having one terminal thereof grounded, a solenoid normally included in circuit between an ungrounded terminal of said source of power and one of the terminals of the generator of said set, a switch for connecting said source of power to the motor of said set connected to said solenoid to be closed thereby when said solenoid is energized by grounding one of the terminals of said generator, means for maintaining said switch closed as long as current is drawn from the generator of said set and means responsive to the cessation of the flow of current from said generator for a predetermined length of time for opening said switch.

2. A welding system comprising a motor-generator set, a source of power for driving the motor of said set, a switch for opening and closing a circuit between said source of power and the motor of said set, means responsive to the grounding of one terminal of the generator of said set for closing said switch, means responsive to the flow of current from said generator for maintaining said switch closed and means responsive to the cessation of the flow of current from said generator for a predetermined length of time for opening said switch.

3. A welding system comprising a motor-generator set, a source of power for driving the motor of said set, said source of power having one of the terminals grounded, an input power switch for opening and closing a circuit between said source of power and the motor of said set, a welding electrode connected to one of the terminals of the generator of said set, means including a welding current circuit switch and a relay connected in series between the other terminal of said generator and ground, means responsive to the grounding of said welding electrode for closing the imput power switch and the welding current circuit switch, means responsive to the flow of current in said relay for maintaining said switches closed, and means responsive to the de-energization of said relay for a predetermined length of time for opening said switches.

4. A welding system comprising a welding current generator, a motor for driving said generator, a source of electrical energy for driving said motor, said source of electrical energy having one terminal thereof grounded, a motor controlling switch connected in circuit between said source of electrical energy and said motor, a welding electrode connected to one of the terminals of said generator, a welding circuit switch connected between the other terminal of said generator and ground, means responsive to the grounding of said welding electrode for closing said motor controlling switch, means responsive to the closure of said motor controlling switch for closing said welding circuit switch, means responsive to the flow of current from said generator for maintaining said switches closed, means responsive to the cessation of current flow from said generator for a predetermined length of time for opening said welding circuit switch, and means responsive to the opening of said welding circuit switch for opening said motor controlling switch.

5. A welding system comprising a welding current generator, a motor for driving said generator, a source of electrical energy for driving said motor, a motor controlling switch connected in circuit between said source of electrical energy and said motor, a welding electrode connected to one of the terminals of said generator, a generator grounding switch connected in circuit between the other terminal of said generator and ground, an auxiliary switch, means responsive to the grounding of said welding electrode for closing said generator grounding switch and said auxiliary switch, means responsive to the closure of said auxiliary switch for closing said motor controlling switch, means responsive to the flow of current from said generator for maintaining all of said switches closed, means responsive to the cessation of current flow from said generator for a predetermined length of time for opening said welding circuit switch and said auxiliary switch and means responsive to the opening of said auxiliary switch for opening said motor controlling switch and shutting down said motor-generator set when no welding current is desired.

6. A welding system comprising a motor-generator set, a source of power for driving the motor of said set, said source of power having one of the terminals grounded, an imput power switch for opening and closing a circuit between said source of power and the motor of said set, a welding electrode connected to one of the terminals of the generator of said set, means including a welding current circuit switch and a relay connected in series between the other terminal of said generator and ground, means responsive to the grounding of said welding electrode for closing the imput power switch and the welding current circuit switch, means responsive to the flow of current in said relay for maintaining said switches closed, means responsive to the de-energization of said relay for a predetermined length of time for opening said switches, and a safety device for preventing the energization of any of said devices when said device is set in a predetermined position.

7. A welding system comprising a welding current generator, a motor for driving said generator, a source of electrical energy for driving said motor, said source of electrical energy having one terminal thereof grounded, a motor controlling switch connected in circuit between said source of electrical energy and said motor, a welding electrode connected to one of the terminals of said generator, a welding circuit switch connected between the other terminal of said generator and ground, means responsive to the grounding of said welding electrode for closing said motor controlling switch, means responsive to the closure of said motor controlling switch for closing said welding circuit switch, means responsive to the flow of current from said generator for maintaining said switches closed, means responsive to the cessation of current flow from said generator for a predetermined length of time for opening said welding circuit switch, means responsive to the opening of said welding circuit switch for opening said motor controlling switch, and means for disabling the energization of said motor controlling switch actuating means.

8. A welding system comprising a welding current generator, a motor for driving said generator, a source of electrical energy for driving said motor, a motor controlling switch connected in circuit between said source of electrical energy and said motor, a welding electrode connected to one of the terminals of said generator, a generator grounding switch connected in circuit between the other terminal of said generator and ground, an auxiliary switch, means responsive to the grounding of said welding electrode for closing said generator grounding switch and said auxiliary switch, means responsive to the closure of said auxiliary switch for closing said motor controlling switch, means responsive to the flow of current from said generator for maintaining all of said switches closed, means responsive to the cessation of current flow from said generator for a predetermined length of time for opening said welding circuit switch and said auxiliary switch, means responsive to the opening of said auxiliary switch for opening said motor controlling switch and shutting down said motor-generator set when no welding current is desired, and means for preventing the energization of said generator grounding switch when said means is set in a predetermined desired position.

9. In combination with a source of electrical energy having a driving motor, means to establish an operating circuit from said source, said circuit also being the stopping and starting circuit for the driving motor, said means including a switch, and means also energized from said source operable to automatically close and hold said switch closed through the action of a load in the circuit of the source of electrical energy and automatically open said switch after removal of the load for a predetermined time.

10. A power supply system for changing electrical energy of one form to electrical energy of another form comprising a device having a power input circuit and a power output circuit, a source of electrical energy, a switch for connecting said source of electrical energy to the power input circuit of said device, means for automatically closing said switch to connect said source of electrical energy to the power input circuit of said device responsive to the closure of the power output circuit of said device, means responsive to the flow of current of a predetermined value in the power output circuit of said device for holding said switch closed, and means responsive to the cessation of current flow of a predetermined value in said output circuit for a predetermined time for opening said switch.

11. A power supply system for changing electrical energy of one form to electrical energy of another form comprising a motor generator set, a primary source of electrical energy for driving the motor of said set, a switch for connecting and disconnecting the motor from said primary source, means for automatically closing said switch responsive to the closure of the output circuit from the generator of said set, means responsive to the flow of current of a predetermined value from said generator for holding said switch closed, and means responsive to the cessation of the flow of current from said generator for a predetermined time for opening said switch.

12. In electrical apparatus, a power circuit having a circuit opening and closing device, said device being adapted to operate after a predetermined time for circuit opening, means operated by said circuit, and control means for the first mentioned means, said control means utilizing energy from said circuit upon removal of load from said first mentioned means for opening the power circuit automatically after a predetermined time and automatically closing said circuit when a load is applied.

13. In electrical apparatus, a circuit functioning as a combined remote control and power circuit, including a motor generator and a motor switch, having an electrical device and a time delay relay therein controlled by the load of said motor generator, and electromagnetic means controlled by the relay to actuate said motor switch so as to connect the motor to its supply circuit when a load is applied and disconnect the motor after a predetermined time when the load is removed.

14. A power converting system for changing electrical energy of one form to electrical energy of another form including a circuit functioning as a remote control circuit as well as a power utilizing circuit, a switch for connecting and disconnecting said converting system to and from a primary source of electrical energy, means for automatically closing said switch responsive to the closure of said circuit, means responsive to the flow in said circuit of current of a predetermined value for holding said switch closed, and means responsive to the cessation of the flow of current in said circuit for a predetermined time for opening said switch.

15. A power supply system for generating and supplying electrical welding energy to a welding circuit responsive to the closure of welding contacts connected across said circuit and for stopping the generation of electrical energy responsive to the opening of the welding contacts of said circuit for a predetermined length of time comprising a motor generator set, means for connecting the motor of said set to a source of potential responsive to the closure of the welding contacts, and means for disconnecting the motor of said set from the source of potential responsive to the opening of the welding contacts for a predetermined time.

THOMAS W. WINSOR.